United States Patent
Blasinski

(10) Patent No.: US 9,663,101 B2
(45) Date of Patent: May 30, 2017

(54) DRIVE DEVICE FOR A HYBRID VEHICLE

(71) Applicant: AUDI AG, Ingolstadt (DE)

(72) Inventor: Boris Blasinski, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/913,162

(22) PCT Filed: Jul. 30, 2014

(86) PCT No.: PCT/EP2014/002081
§ 371 (c)(1),
(2) Date: Feb. 19, 2016

(87) PCT Pub. No.: WO2015/024621
PCT Pub. Date: Feb. 26, 2015

(65) Prior Publication Data
US 2016/0200312 A1     Jul. 14, 2016

(30) Foreign Application Priority Data
Aug. 21, 2013    (DE) ........................ 10 2013 013 954

(51) Int. Cl.
*B60K 6/48*      (2007.10)
*F02D 29/02*    (2006.01)
(Continued)

(52) U.S. Cl.
CPC ............... *B60W 20/20* (2013.01); *B60K 6/20* (2013.01); *B60L 11/1859* (2013.01);
(Continued)

(58) Field of Classification Search
CPC ... B60W 30/18027; B60K 6/445; B60K 6/48; B60K 6/28; B60K 6/365; H02J 7/0042; B60L 1/003; B60L 3/12; F02D 29/02
See application file for complete search history.

(56) References Cited

U.S. PATENT DOCUMENTS 6,137,250 A    10/2000   Hirano et al.
7,360,615 B2     4/2008   Salman et al.
(Continued)

FOREIGN PATENT DOCUMENTS

DE          197 00 893 C1    9/1998
DE    10 2008 008 863 A1    8/2009
(Continued)

OTHER PUBLICATIONS

International Search Report issued by the European Patent Office in International Application PCT/EP2014/002081.

*Primary Examiner* — Yuri Kan
(74) *Attorney, Agent, or Firm* — Henry M. Feiereisen LLC

(57) ABSTRACT

A hybrid vehicle includes at least one drive axle which can be driven by means of a drive device, which has an accumulator, an electric machine coupled to the accumulator in order to exchange electric energy and an internal combustion engine which, when activated, mechanically drives the electric machine to generate electric energy. The hybrid vehicle also includes a control unit which controls both the electric machine and the internal combustion engine. The control unit is designed to operate the electric machine exclusively to start up the hybrid vehicle, until a threshold speed which allows the vehicle to be driven by the internal combustion engine is reached, and to control the operation of the electric machine and the internal combustion engine so that when the hybrid vehicle comes to a halt, the electric charge in the accumulator exceeds a predefinable comparison value, which is calculated such that the electric energy stored in the accumulator allows a start up of the hybrid vehicle by means of the electric machine up to the threshold speed.

7 Claims, 1 Drawing Sheet

(51) Int. Cl.
  *B60W 20/20*   (2016.01)
  *B60K 6/20*    (2007.10)
  *B60W 10/26*   (2006.01)
  *B60W 30/18*   (2012.01)
  *B60L 11/18*   (2006.01)
  *B60W 10/06*   (2006.01)
  *B60W 10/08*   (2006.01)
  *B60W 20/13*   (2016.01)
  *B60W 20/11*   (2016.01)
  *B60W 50/00*   (2006.01)

(52) U.S. Cl.
  CPC ....... *B60L 11/1861* (2013.01); *B60L 11/1862* (2013.01); *B60W 10/06* (2013.01); *B60W 10/08* (2013.01); *B60W 10/26* (2013.01); *B60W 20/11* (2016.01); *B60W 20/13* (2016.01); *B60W 30/181* (2013.01); *B60W 30/18018* (2013.01); *B60W 30/18027* (2013.01); *B60L 2240/12* (2013.01); *B60L 2250/10* (2013.01); *B60L 2250/16* (2013.01); *B60W 50/0097* (2013.01); *B60W 2510/244* (2013.01); *B60W 2710/244* (2013.01); *B60Y 2200/92* (2013.01); *B60Y 2300/43* (2013.01); *B60Y 2300/60* (2013.01); *B60Y 2300/91* (2013.01); *Y02T 10/6291* (2013.01); *Y10S 903/93* (2013.01)

(56) References Cited

U.S. PATENT DOCUMENTS

| | | |
|---|---|---|
| 8,676,423 B2 | 3/2014 | Blasinski et al. |
| 2002/0003417 A1* | 1/2002 | Bito .................. B60K 6/48 320/152 |
| 2002/0109407 A1* | 8/2002 | Morimoto ............ B60K 6/28 307/10.1 |
| 2009/0277701 A1 | 11/2009 | Soma et al. |
| 2010/0001523 A1* | 1/2010 | Sato .................. B60K 6/48 290/31 |
| 2010/0140001 A1* | 6/2010 | Oe .................... B60K 6/365 180/65.275 |
| 2012/0041630 A1* | 2/2012 | Yamamoto ........... B60K 6/445 701/22 |
| 2012/0226406 A1* | 9/2012 | Kaita ................. B60K 6/445 701/22 |
| 2013/0093393 A1* | 4/2013 | Shimotani ............ B60L 3/12 320/109 |
| 2013/0186233 A1 | 7/2013 | Kaltenbach |
| 2013/0200845 A1* | 8/2013 | Bito .................. H02J 7/0042 320/109 |
| 2013/0211642 A1 | 8/2013 | Blasinski et al. |
| 2015/0051818 A1* | 2/2015 | Yamamoto ........... F02D 29/02 701/112 |
| 2015/0298682 A1* | 10/2015 | Hata .................. B60K 6/445 477/5 |
| 2016/0089981 A1* | 3/2016 | Kodawara ............ B60L 1/003 307/10.1 |

FOREIGN PATENT DOCUMENTS

| | | |
|---|---|---|
| DE | 10 2010 016 188 A1 | 11/2010 |
| DE | 10 2010 010 149 A1 | 9/2011 |
| DE | 10 2010 030 573 A1 | 12/2011 |
| DE | 10 2011 082 336 A1 | 3/2013 |
| DE | 10 2011 085 149 A1 | 4/2013 |
| DE | 10 2011 089 085 A1 | 6/2013 |

* cited by examiner

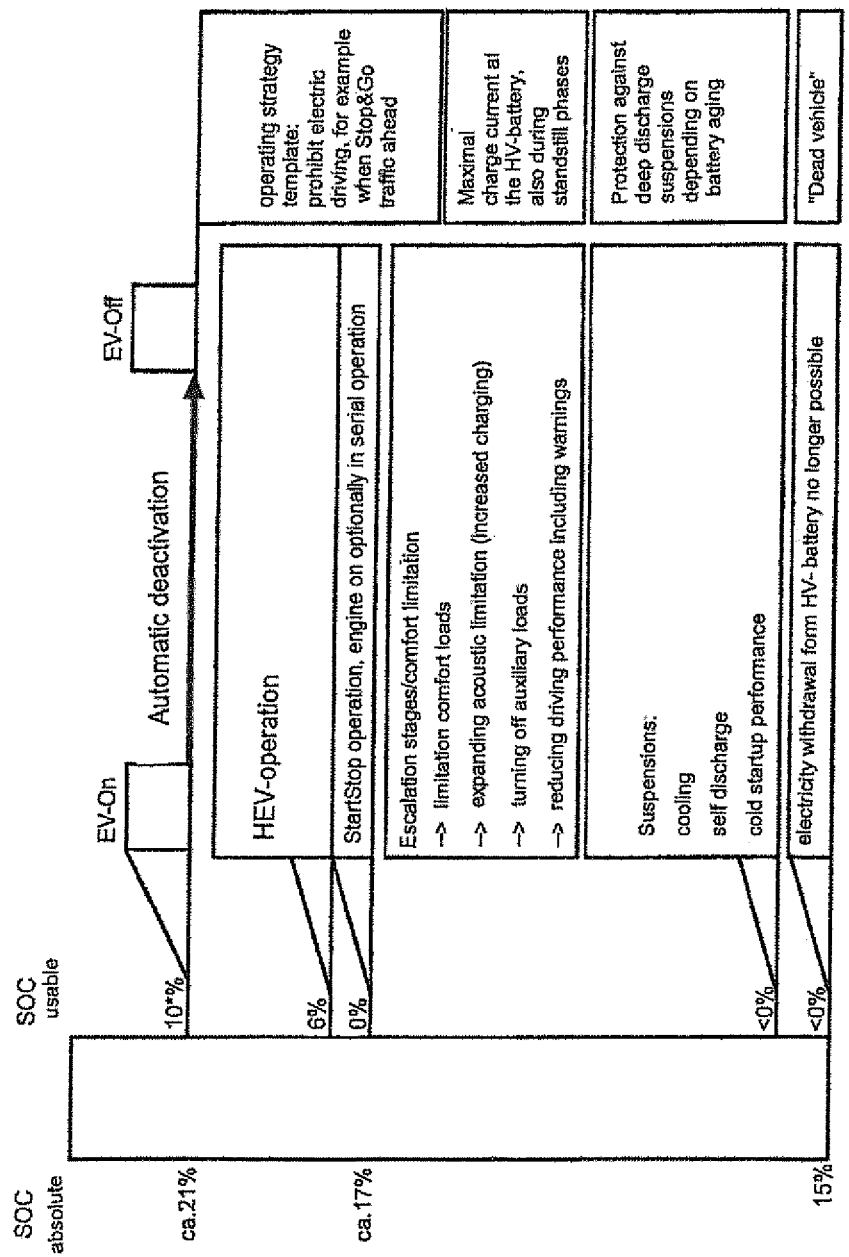

DRIVE DEVICE FOR A HYBRID VEHICLE

CROSS-REFERENCES TO RELATED APPLICATIONS

This application is the U.S. National Stage of International Application No. PCT/EP2014/002081, filed Jul. 30, 2014, which designated the United States and has been published as International Publication No. WO 2015/024621 and which claims the priority of German Patent Application, Serial No. 10 2013 013 954.6, filed Aug. 21, 2013, pursuant to 35 U.S.C. 119(a)-(d).

BACKGROUND OF THE INVENTION

The invention relates to a hybrid vehicle with at least one drive axle, which can be driven by means of a drive device, which drive device has an accumulator, an electric machine coupled with the accumulator for exchanging electric energy, and an internal combustion engine, which in an active state mechanically drives the electric machine for generating electric energy, and with a control unit which controls the electric machine and the internal combustion engine. The invention also relates to a method for operating a vehicle that can be driven by means of an electric machine as well as with an internal combustion engine, wherein the electric machine and an accumulator of the hybrid vehicle are electrically coupled to each other for exchanging electric energy and wherein the electric machine in an active state of the internal combustion engine is mechanically driven by the internal combustion engine so that the electric machine generates electric energy.

Generic hybrid vehicles with drive devices and methods for operating the drive device are generally known in the state of the art, which thus does not have to be further exemplified in the form of specific references. Hybrid vehicles are vehicles of the general type, also referred to as motor vehicles, and serve for transportation on land. A characteristic feature of hybrid vehicles is that they have both an internal combustion engine and at least one electric machine as drive aggregates.

The electric machine is usually operated at an inverter, which enables an electric coupling between an accumulator of the hybrid vehicle and the electric machine. For this purpose the accumulator provides an intermediate circuit or is connected to such an intermediate circuit to which also the inverter for the electric machine is connected. In this way the electric coupling between the electric machine and the accumulator is accomplished. The intermediate circuit is usually configured as direct voltage intermediate circuit.

In vehicles of the general type, internal combustion engines can usually be coupled with the drive axle of the vehicle via a mechanical clutch, so as to enable starting up and also shifting procedures during normal operation. Such a clutch is usually provided for the internal combustion engine also in hybrid vehicles to enable reliable starting up independent of the operational readiness of the electric machine. In conventional non-hybrid vehicles this function is strictly required for proper operation.

The mechanical clutch in motor vehicles is a device that is subject to wear and besides being a cost factor in and of itself requires maintenance work.

SUMMARY OF THE INVENTION

It is an object of the invention to provide an improvement in this regard.

The principle idea of the invention is to reduce or in particular avoid the clutch for coupling the internal combustion engine with the drive axle. In contrast to internal combustion engines, electric machines can reliably and safely be operated from standstill for the purpose of propulsion. At the same time electric machines also provide great torques even at small rotational speeds so that a reliable propulsion of the vehicle, in particular the hybrid vehicle, can be achieved by means of the electric machine.

For this purpose an internal combustion engine has to achieve a minimal rotational speed in order to be able to provide a sufficient torque. Transmitting the torque in a stationary vehicle from the internal combustion engine to the drive axle requires corresponding clutch devices. When instead of the internal combustion engine only the electric machine is used for starting up the vehicle, the internal combustion engine no longer has to be coupled with the drive axle for starting up.

The invention therefore proposes that in a drive device of a hybrid vehicle, the control unit is configured to exclusively operate the electric machine so as to start up the vehicle up to a threshold speed which allows driving the hybrid vehicle by means of the internal combustion engine and is configured to control the operation of the electric machine and the internal combustion engine so that when stopping the hybrid vehicle the electric charge of the accumulator exceeds a predeterminable comparative value which is determined so that the electric energy stored in the accumulator allows a starting up of the hybrid vehicle by means of the electric machine of the drive up to the threshold speed of the hybrid vehicle.

The threshold speed is defined by the properties of the hybrid vehicle, in particular with regard to the internal combustion engine, and represents the speed at which the internal combustion engine can be coupled with the drive axle of the hybrid vehicle, wherein the internal combustion engine can then provide a torque for driving the hybrid vehicle, preferably without the electric machine having to provide an additional torque for the drive. This value for the threshold speed can be fixed predetermined value in the control device so that from this value the threshold speed required for the starting can be determined. The corresponding energy amount is therefore to be reserved in the accumulator as minimal reserve when stopping the hybrid vehicle. This ensures that the accumulator can always provide a sufficient amount of energy for starting up the hybrid vehicle so that the hybrid vehicle can be started up by means of the electric machine without the aid of the internal combustion engine. Preferably the starting up is conducted from a non-driving state of the hybrid vehicle, i.e., at zero speed. Correspondingly stopping in particular means reducing the speed of the hybrid vehicle to zero speed. In alternative embodiments of the invention also a speed which is below the threshold speed but different from zero can be provided. Alternatively instead of the threshold speed also a threshold rotational speed can be defined for which the comparative value is determined. Hereby, defined parameters determined by the hybrid vehicle such as vehicle mass and/or the like have to be taken into account.

This allows reducing not only the cost regarding a clutch device for coupling the internal combustion with the drive axle of the hybrid vehicle but also the efficiency during starting up can be increased because the use of a clutch during starting up usually significantly reduces efficiency. This overall enables saving energy, namely fuel for the internal combustion engine. At the same time this also reduces emissions of the hybrid vehicle.

The internal combustion engine can be a conventional internal combustion engine for motor vehicles, which for example utilizes fuel such as benzene, diesel, gasoline, alcohol and/or the like. The electric machine is in particular a rotating electric machine. Of course more than one electric machine can be provided, in particular when the hybrid vehicle has multiple drive axles and at least two of the drive axles can be driven with a respective electric machine. For example the drive axle can also have at least one wheel, which can be driven by means of an electric auxiliary machine as electric machine. The electric machine is usually constructed as a rotating electric machine and can for example be a direct voltage machine, an alternating voltage machine, a multiphase alternating voltage machine, in particular a rotary current machine or the like. Preferably the rotary current machine is an asynchronous machine or a synchronous machine.

The accumulator of the hybrid vehicle can for example be formed by a lead-acid-accumulator but also by a lithium-hybrid-accumulator. The accumulator has at least one electrochemical cell, usually however a number of electrochemical cells, which is selected in accordance with a predetermined intermediate circuit voltage. In addition electrochemical cells of the accumulator can be connected in series as well as in parallel or a combination thereof. The accumulator serves for storing electric energy which is supplied to the accumulator in the form of electric current via the intermediate circuit. The accumulator also serves for providing electric energy for which an electric current is withdrawn from the accumulator. The accumulator is characterized in that it does not irreversibly convert substances for its proper use. Is substance conversion in the electrochemical cell is usually defined by reversible chemical processes.

The coupling of the accumulator with electric machine via the inverter makes it possible to supply electric energy to the accumulator when the electric machine is operated in the generator mode, but also to withdraw electric energy from the accumulator, in particular when the electric machine is operated in the engine mode. The usually present inverter, to which the electric machine is connected for this purpose, correspondingly converts the electric energy so that the electric machine can be electrically electric adjusted to the.

By means of the control device the operation of the entire drive device is controlled. This includes the control of the electric machine as well as the control of the internal combustion engine. The control itself can of course be segmented and include functional groups that are adapted to the corresponding components to be controlled. In particular the inverter for the electric machine can be a part of the control unit. The invention ensures that when stopping the hybrid vehicle sufficient electric energy is always present in the accumulator so that the hybrid vehicle can be started up to the threshold speed solely by means of the electric machine without using the internal combustion engine. When reaching the threshold speed the internal combustion engine can be activated in particular without using clutch devices as acquired in the state-of-the-art for starting up the vehicle by means of an internal combustion engine.

It is particularly advantageous when the control unit determines the required energy based on the situation at hand, so that also changes to the drive device, in particular regarding the accumulator, the electric machine and/or the internal combustion engine, can be taken into account.

The control device determines a comparative value, which is a measure of the amount of energy that has to be present in the accumulator when stopping the hybrid vehicle. Correspondingly the drive device, and here in particular the internal combustion engine and the electric machine, are controlled.

In order for the control unit to perform its task, it is connected with a detection device, or respectively includes a detection device, by means of which an actual value for the electric energy stored in the accumulator can be determined. At the same time the control unit can be configured to determine the vehicle parameters of the hybrid vehicle such as speed or the like, so that it can for example determine information regarding the kinetic energy of the hybrid vehicle. By taking these parameters into account the control unit can correspondingly control the drive device in order to ensure that when stopping the hybrid vehicle the required amount of electric energy is stored in the accumulator. Preferably the control unit also detects which electric components of the hybrid vehicle influence the electric energy stored in the accumulator. This enables an accurate detection and a reliable operation of the hybrid vehicle. In particular a startup element, for example a clutch or the like for the internal combustion engine can be simplified or is not required.

An embodiment of the invention provides that the accumulator includes a separately operable startup accumulator, whose electric energy exclusively serves for starting up the hybrid vehicle up to the threshold speed via the electric machine. This separate startup accumulator enables a decoupling from the accumulator of the hybrid vehicle so as to better ensure that the minimum required electric energy for starting up the hybrid vehicle is available. The startup accumulator can be a separate component of the hybrid vehicle, in particular of the drive device, so that it can be easily replaced and in the case of malfunction in which the accumulator no longer has sufficient energy for starting up, the startup accumulator can be easily charged externally. Preferably the startup accumulator is configured as a replaceable module so that it only has to be replaced in order to restore the startup capability of the hybrid vehicle.

An embodiment of the invention provides that the internal combustion engine can be coupled with the drive axle of the hybrid vehicle in the absence of startup elements. In this way—as mentioned above—the efficiency when starting up the hybrid vehicle can be increased and the costs for a possible clutch can be reduced.

The hybrid vehicle can have more than one drive axle, for example two drive axles or more drive axles. In particular all axles of the hybrid vehicle may be configured as drive axles. It can be provided that for each drive axle an individual electric machine is provided, which can be controlled with the control unit. In this case the electric machines can either be controlled individually or together. Preferably an individual inverter is provided for each electric machine. The inverters are preferably controllable by the control unit. In addition each axle may be provided with at least one wheel, wherein the electric machine is configured in at least one wheel as hub machine.

When more than one electric machine is provided, all electric machines can be provided for the starting up. However, it can also be provided that only a single electric machine or a limited number of all electric machines is used for starting up the hybrid vehicle. The number and the type of electric machines, that are used in this case for starting up can be determined by the control unit and correspondingly controlled.

The method of the invention provides that for starting up the hybrid vehicle up to a threshold speed, which enables a drive of the hybrid vehicle by means of the internal combustion engine, only the electric machine is operated and that the operation of the electric machine and the internal combustion engine is controlled so that when stopping the hybrid vehicle the electric charge of the accumulator exceeds a predetermined comparative value, which is determined so that the electric energy stored in the accumulator enables starting up the hybrid vehicle by means of the electric machine up to the special speed.

The same advantages already mentioned in connection with the hybrid. vehicle can thus also be obtained with the method.

According to a further aspect of the invention, the comparative value is set in dependence on accumulator parameters. Accumulator parameters can for example be parameters that influence a capacitance of the accumulator, in particular an aging condition of the accumulator or the like. This enables improving the accuracy of determining the comparative values.

An embodiment provides that the comparative value is set in dependence on environmental parameters. In this way for example ambient temperatures, but also accumulator temperatures and/or the like can be taken into account in order to determine or set the comparative value.

An accumulator parameter can also be an accumulator temperature from which a temperature-dependent capacitance and/or energy amount of the accumulator can be determined by using a corresponding characteristic field for the respective accumulator.

A further embodiment of the invention provides that the comparative value is re-determined when starting up and/or stopping. Preferably the re-determination of the comparative value occurs at each starting up and/or each stopping. This enables adjusting the determining of the comparative value to an actual situation, for example actually present accumulator parameters or the like. The accuracy of determining the comparative value can be further improved.

According to a further embodiment the electric charge of the accumulator is determined in dependence on a property of a stopping position. The stopping position is preferably a geographic position at which the hybrid vehicle stands at the end of a stopping process. By using the geographic properties, for example an incline, a downhill slope and/or the like the comparative value can be determined in a manner adjusted to the situation at hand. For this purpose the control unit communicates with a navigation device of the hybrid vehicle or with a device for providing geographic data. The communication can for example be wireless, in particular via a communication network such as Universal Mobile Telecommunications System (UMTS) or also Long-Term Evolution (LTE) or the like.

According to an embodiment it is proposed that during the starting up at least one electric load of the hybrid vehicle is turned off and/or is prevented from being turned on. As a result, unforeseen decreases of the energy amounts required for the starting up are taken into account. Thus for example an air conditioning system or a seat heating may be turned off during the starting up of the hybrid vehicle in order to increase the available energy amount. This further improves reliability of the starting up of the hybrid vehicle.

BRIEF DESCRIPTION OF THE DRAWING

Further advantages and features are illustrated by the following exemplary embodiment and a FIGURE.

The sole FIGURE shows a schematic diagram of a behavior at low charge state of an accumulator of a hybrid vehicle.

DETAILED DESCRIPTION OF PREFERRED EMBODIMENTS

The not shown hybrid vehicle according to the invention has a drive axle and a second non-driven axle, wherein the drive axle can be driven by means of a not shown electric machine and an also not shown internal combustion engine. In the present case no startup element is provided for the internal combustion engine. In such hybrid vehicles the internal combustion engine can thus only be coupled via the transmission to the road after reaching a defined speed or rational speed, i.e., the threshold speed or threshold rotational speed. Below this threshold speed only the electric drive accomplishes propulsion by means of the electric machine. For this purpose the hybrid vehicle has a traction battery as accumulator, which may limit the driving performance in particular in the case of a low charge level.

In order to reliable ensure the startup of the hybrid vehicle under the aforementioned conditions and to ensure that the hybrid vehicle is also operational at a low charge level of the traction battery, in particular when fuel in a fuel accumulator for the internal combustion engine is not yet used up, a control device is provided which controls the electric machine and the internal combustion engine of the drive device of the hybrid vehicle.

The control device is configured to exclusively operate the electric machine for starting up the hybrid vehicle up to a threshold speed which enables a drive of the hybrid vehicle by means of the internal combustion engine and to control the operation of the electric machine and the eternal combustion engine so that when stopping the hybrid vehicle the electric charge in the accumulator exceeds a predetermined comparative value, which is determined so that the electric energy stored in the traction battery enables a startup of the hybrid vehicle by means of the electric machine of the drive device by means of the electric machine up to the drive device up to the threshold speed.

For this purpose an operating strategy is provided which involves different escalation stages, which enables reliable startup of the hybrid vehicle according to the invention. It is provided to determine an energy requirement and a charge strategy for the traction battery during driving until stopping of the hybrid vehicle. The comparative value, which is hereby correspondingly determined, preferably also takes electric auxiliary loads, into account, which may for example be reduced or turned off. In addition the guaranteed driving performance can be prioritized via acoustic restrictions. This takes into account that the use of the internal combustion engine leads to an acoustic impairment in particular at low speeds. It can be provided to vary threshold speed or rotational speed in dependence on the charge state of the traction battery.

In the present case, the comparative value is determined at a central site, via which the control unit can wirelessly gain access by means of a communication connection. This enables an accurate determination of the required electric energy in the traction battery and with this the comparative value, wherein the determination is based on the analysis of actions of the driver, environmental information and a prediction of future driving situations.

The invention can therefore ensure an unimpeded startup performance even in the absence of a startup element for the internal combustion engine, because a completely discharged traction battery is avoided. Required energy reserves for operation below a coupling rotational speed of the internal combustion engine can be kept as small as possible but as large as necessary.

The diagram of the FIGURE shows the behavior according to the invention at declining state of charge (SOC), i.e., at declining charge state of the traction battery. In a bar diagram on the left the absolute charge state is shown in percent relative to the usable charge state. At 10% usable charge state the automatic deactivation is initiated. At zero percent usable charge state a start-stop operation is initiated, i.e., the internal combustion engine is turned on and the electric machine is optionally operated as a generator in the serial operation, in order to charge the traction battery.

When the charge state of the traction battery further declines the following escalation stages/comfort limitations result:
limiting of comfort loads
enhancing the acoustic limitation (stronger charging)
turning off auxiliary loads
reducing driving performance including warnings When the charge state of the traction battery further declines, further reserves can be taken into account for the determination of the comparative value, for example for the cooling, the self-discharge of the traction battery, and/or optionally a cold start performance, which may be required especially after a longer standstill of the hybrid vehicle.

A further reduction of the charge state of the traction battery at an absolute charge state of about 15 percent then leads to the fact that electricity can no longer be withdrawn from the traction battery (HV battery).

When the SOC is decreased to a minimum due to electric driving, the electric machine is used early for charging electric energy storage, i.e., the accumulator, here the traction battery. When the energy requirement of the electric machine cannot be covered, the measures according to the operating strategy as shown in the FIGURE are executed step by step.

The FIGURE shows in the left side a bar which illustrates a charge state of the traction battery. On the left side of the bar the absolute charge state of the traction battery is shown. In the present case, normal operation is authorized at an absolute charge state of 17%. This charge state is assigned a relative charge state of 0% on the right side of the bar. Below an absolute charge state of 15% withdrawal of energy from the traction battery is deactivated, in the present case by means of a not further shown hardware switch, in order to protect the traction battery from damage due to deep discharge.

On the right side of the bar the relative levels of the charge state are shown, which indicate the escalation stages with regard to the operation of the hybrid vehicle. Above a relative charge state of 10%, which corresponds to an absolute charge state of 21%, the driver can activate or deactivate a driving operation which avoids as far as possible the use of the internal combustion engine by means of an EV-On/EV-Off button in the cockpit of the hybrid vehicle. When this drive mode is activated and the relative charge state is 10% or lower, the deactivation is automatically executed i.e., the use of the internal combustion engine is taken into account for the further operation of the hybrid vehicle so that preferably a charging of the traction battery can occur.

In a range of the relative chart state between about 10% and 6% the hybrid vehicle is operated by using the electric machine as well as the internal combustion engine, preferably in order to avoid or limit a further discharge of the traction battery or optionally to effect charging of the traction battery.

When the relative charge state of the traction battery declines to 0% the internal combustion engine is turned on in order to be able to operate the electric machine in the generator mode.

When the relative charge state of the traction battery declines further, further escalation stages are activated as can be seen from the FIGURE. In particular an acoustic limitation can be expanded so that early use of the internal combustion engine enables early charging of the traction battery. Also reserves regarding a cooling, a self-discharge of the traction battery and a cold start performance can be taken into account.

The lower threshold of the charge state at which the electric machine is always used for traction if possible, is raised, when a traffic jam and/or stop-and-go phase or a strong road incline is predicted based on car2car or navigation data information.

The exemplary embodiment described above only serves for explaining the invention and does not limit the invention. In particular features of the claims and the description may of course also be combined with each other in almost any desired manner in order to create further embodiments of the invention.

In particular instead of the speed also a rotational speed can be provided, for example a threshold rotational speed instead of a threshold speed and the like. The invention then has to be correspondingly adapted.

In addition device features can of course be realized by corresponding method steps and vice versa.

The invention claimed is:

1. A hybrid vehicle, comprising:
at least one drive axle;
a drive device for driving the at least one drive axle, said drive device comprising an accumulator, an electric machine electrically coupled with the accumulator for exchange of electric energy between the accumulator and the electric machine, and an internal combustion engine, which in an active state mechanically drives the electric machine for generating electric energy; and
a control device including a control unit for operation of the electric machine and the internal combustion engine, so that when the hybrid vehicle stops, an electric charge of the accumulator exceeds a predetermined comparative value, and a deactivation is automatically executed below a predetermined comparative charge state of the accumulator, said deactivation being a deactivation of EV-ON traveling mode to EV-OFF mode, which is set so that the electric charge of the accumulator is sufficient to startup the hybrid vehicle by means of the electric machine up to a threshold speed at which a drive of the hybrid vehicle by means of the internal combustion engine is enabled, said electric charge of the accumulator being determined in dependence on a property of a stopping position, which is a geographic position, where the control unit communicates with a navigation device of the hybrid vehicle by a wireless technology or a Universal Mobile Telecommunications System for thereby providing the geographic position, said accumulator comprising a separately operable startup accumulator, said control device being configured to exclusively operate the electric machine during the start up of the hybrid vehicle up to the threshold speed by exclusively using the electric charge of the startup accumulator and during a starting up turning off at least one electric load of the hybrid vehicle and/or preventing the electric load from being turned on.

2. The hybrid vehicle of claim 1, wherein the internal combustion engine is couplable with the drive axle of the hybrid vehicle in an absence of startup elements.

3. A method for operating a hybrid vehicle drivable with an electric machine and an internal combustion engine, said method comprising:

driving the electric machine with the internal combustion engine in an active state of the internal combustion engine thereby generating electric energy with the electric machine;

exchanging electric energy between the electric machine and an accumulator electrically coupled with the electric machine, said accumulator including a separately operable startup accumulator;

controlling operation of the electric machine and the internal combustion engine so that when stopping the hybrid vehicle an electric charge of the accumulator exceeds a predetermined comparative value, said predetermined comparative value being determined so that the electric charge enables a startup of the hybrid vehicle by means of the electric machine up a threshold speed which enables a drive of the hybrid vehicle by means of the internal combustion engine, said electric charge of the accumulator being determined in dependence on a property of a stopping position, which is a geographic position, where the control unit communicates with a navigation device of the hybrid vehicle by a wireless technology or a Universal Mobile Telecommunications System for thereby providing the geographic position;

starting up the hybrid vehicle up to the threshold speed exclusively with the electric machine by exclusively using an electric charge of the separately startup accumulator; and during the starting up turning off at least one electric load of the hybrid vehicle and/or preventing the electric load from being turned on.

4. The method of claim 3, wherein the comparative value is set in dependence on accumulator parameters.

5. The method of claim 3, wherein the comparative value is set in dependence on environmental parameters.

6. The method of claim 3, wherein the comparative value is re-determined when starting up and/or stopping the hybrid vehicle.

7. The method of claim 3, wherein the comparative value is determined in dependence on a property of a stopping position of the hybrid vehicle.

* * * * *